UNITED STATES PATENT OFFICE.

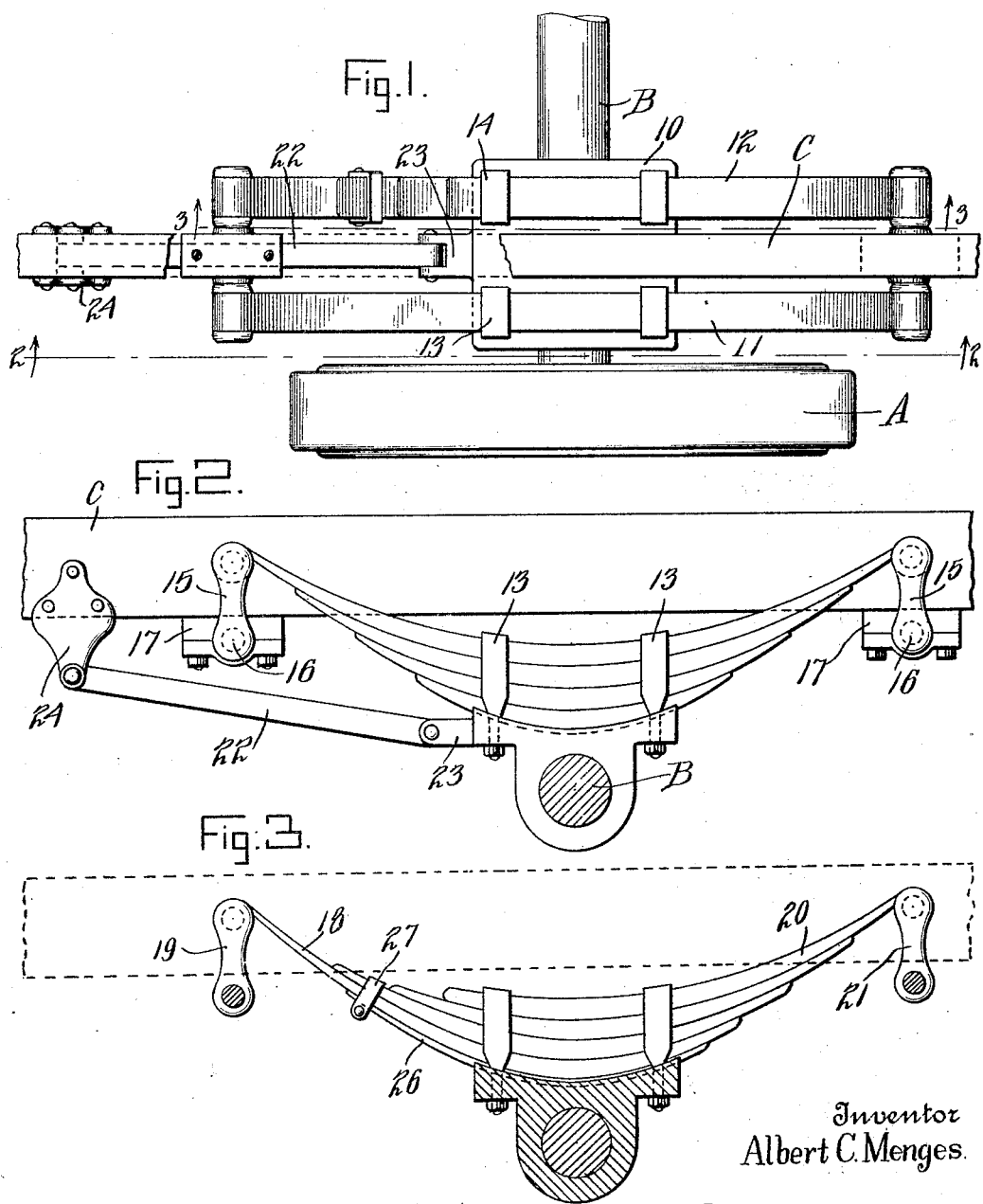

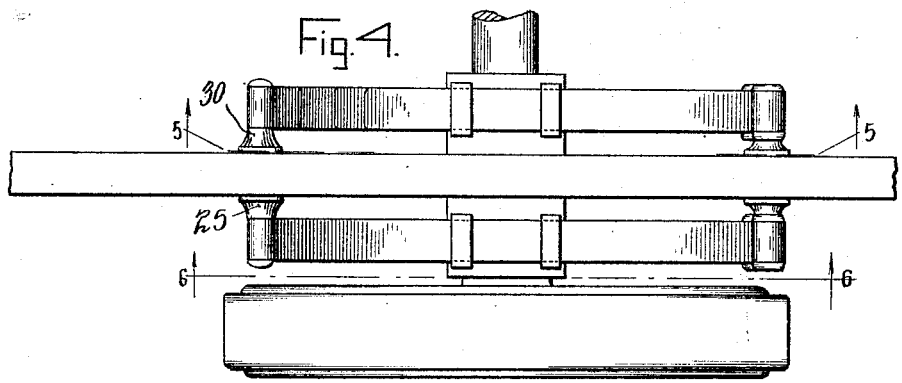
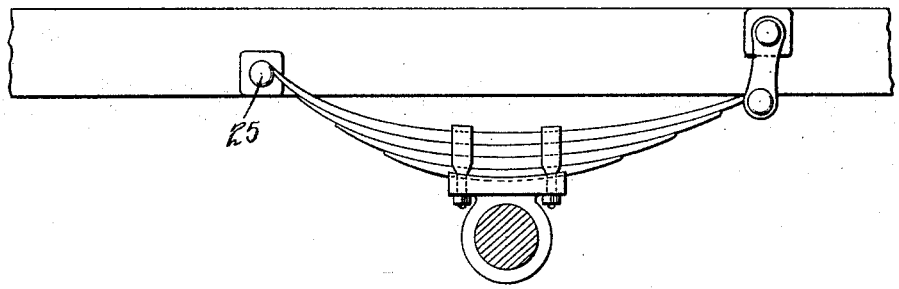
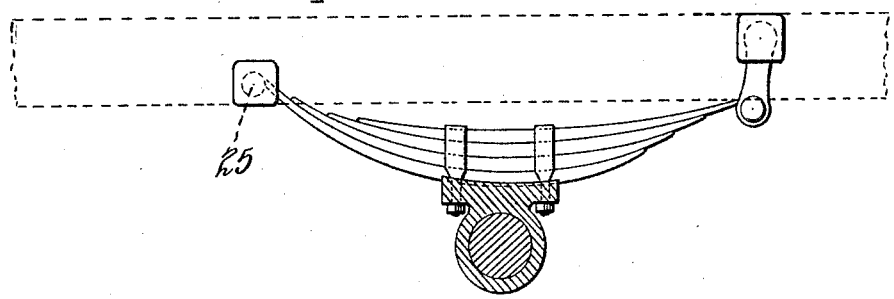

ALBERT C. MENGES, OF MEMPHIS, TENNESSEE, ASSIGNOR TO MENGES MOTORS COMPANY, OF GREENVILLE, MISSISSIPPI, A CORPORATION OF MISSISSIPPI.

VEHICLE SPRING.

1,411,640.  Specification of Letters Patent.  Patented Apr. 4, 1922.

Application filed August 5, 1920. Serial No. 401,312.

*To all whom it may concern:*

Be it known that I, ALBERT C. MENGES, a citizen of the United States, residing at Memphis, in the county of Shelby and State of Tennessee, have invented certain new and useful Improvements in Vehicle Springs, of which the following is a specification.

My said invention consists in an improved construction and arrangement of springs for vehicles, designed especially for trucks and automobiles, whereby a spring is provided for the purpose which will possess various advantages in operation and durability, all as will be hereinafter more fully described and claimed.

Referring to the accompanying drawings, which are made a part hereof and on which similar reference characters indicate similar parts, Figure 1 is a top or plan view, showing one set of springs on one side of the vehicle, Figure 2 a side elevation of the same as seen when looking in the direction indicated by the arrows from the dotted line 2—2 in Figure 1, Figure 3 a similar view of the other spring of the same pair as seen when looking in the direction indicated by the arrows from the dotted line 3—3 in Figure 1, and Figures 4, 5, and 6 views corresponding in the main to Figures 1, 2, and 3 but showing a somewhat modified construction.

In said drawings, the portions marked A represent the vehicle wheel, B the axle and C one of the side bars of the chassis or frame.

These parts are or may be of any appropriate construction and arrangement.

The leading feature of my said invention consists in swinging each side bar or sill of the chassis or frame between two springs at each point of support, and, further in the special arrangement.

An appropriate spring seat or support 10 is mounted on the axle at each end thereof, or on the front bolsters, and the springs 11 and 12, respectively, are mounted thereon and secured by clips 13 and 14. The outside springs 11 are preferably built up as shown in Figure 2 of several leaves, the upper one of which is the full length of the spring, while the leaves beneath decrease gradually in length. Said upper leaf is formed with eyes at its ends which are connected by bolts to the upper ends of links 15, which links are mounted on pivots 16 in bearing blocks 17 on the under sides of the sills.

The inside springs 12 are similarly connected with the parts but are preferably composed of one main leaf 18 at the bottom on one side connected to a swinging link 19 and another main leaf 20 on the other side connected with a swinging link 21, and several leaves interposed between the leaves 18 and 20, positioned, as indicated most clearly in Figure 3, with the ends at the side of leaf 18 receding toward the center from the bottom toward the top and the ends on the side of leaf 20 receding from the end toward the center and from top to bottom. A torque-rod 22 is preferably pivoted at one end to a leg 23 on the spring housing on the axle and at its other end to a bracket 24 on the sill or frame.

The arrangement shown in Figures 4, 5, and 6 is similar to that shown in Figures 1, 2, and 3, the chief difference being that in lieu of the torque-rod 22, the forward set of pivoted links 15 and 19 are omitted and the ends of the springs are secured directly to rigid connections 25 and 30, mounted on the sill and themselves take the thrust or strain for which the rods 22 are provided in the main construction.

The double spring arrangement thus disclosed provides for an easier running truck under varying road conditions, inasmuch as it distributes the weight of the load upon eight points instead of four; the springs adapt themselves to the variations of the load more perfectly than where two springs are used; the weight upon the axle housing is distributed over a greater distance, the long seats for the double springs being wider, thus distributing the strain on the housing more evenly.

The tendency to wrench and twist by driving against only the outside, as when single springs are used, is overcome, inasmuch as the strain upon the frame exerted through the inside spring balances the strain exerted through the outside spring and eliminates all tendency to twist and wrench the springs, which is one of the main causes of crystallization in the frame; the wider bearings tend to hold the axle bearing more rigidly and prevent the tendency of the drive shaft housing to turn downward whenever rough roads are encountered, thus eliminating much of the usual wear upon the universal joints; the wear upon the tires is minimized on account of the greater flexibility, particularly as secured by the type of spring shown in Figures 3 and 6; the rebound after compression is much less, the spring acting in a measure as a shock absorber; by using the shackle 27 around the ends of the leaves to bind them together, the distance which the main spring can give under a heavy load is limited as well as the distance of its rebound.

The type of spring shown in Figures 1, 2, and 3, provides a more flexible and easier riding arrangement than that shown in Figures 4, 5, and 6. With the arrangement shown in Figures 1, 2, and 3, the vehicle body is swung to move freely on the pivoted links 15 and the thrust or drive from the axle B and traction wheels A is through the torque-rods 22, the springs themselves being subject to no drive torque and thus left free to merely support the weight of the load. If desired, a re-inforcing or protecting leaf 26 may be provided underneath the other leaves of the inner spring and the end of said spring may be clamped to the end of the leaf next above the main leaf 18 by a clip 27 and the flexibility of the parts thus limited and the strength and resistance increased.

In the construction shown in Figures 4, 5, and 6, the drive torque is through the springs themselves carried from the axle to the points 25 and 30. By this means, the construction may be made less expensive and such arrangement may be entirely suitable for cheaper classes of vehicles.

It will be noted that the springs are arranged each pair with one spring of the type shown in Figure 2 and the other spring of the type shown in Figure 3. By this arrangement a spring is provided which affords the desired resiliency under comparatively light loads and will afford the required carrying power under comparatively heavy loads; for example, in the case of a two ton truck the outside spring will be built to take care of a one ton load and in case of a load of one ton or less the outside spring will be sufficient to carry the same and will afford greater resiliency than if the spring was built to carry the entire load. When the load is increased above one ton then the second spring comes into action and the weight or load is thus diffused or distributed over the entire spring structure.

Springs constructed as illustrated in Figures 3 and 6 are better adapted to resist "wave" motion when the truck runs over rough places, that is to say, when a truck provided with such springs runs over a rough place instead of there being a continuous bouncing of the truck body up and down on account of the load being brought into motion against the spring, even though the wheels are on a smooth surface, this peculiar construction of spring will cause the load to more promptly resume its normal relation and cease to rebound.

Having thus fully described my said invention, what I claim as new and desire to secure by Letters Patent, is:

1. A spring arrangement for vehicles comprising two springs at each point of support spaced apart and connected to opposite sides of the part of the vehicle frame carried thereby, one of said springs consisting of a series of leaves varying in length from top to bottom and the other of a series of leaves of substantially uniform length bound together in offset relation to each other, substantially as set forth.

2. A spring arrangement for vehicles comprising two springs at each point of support spaced apart and connected to opposite sides of the part of the vehicle frame carried thereby, one of said springs consisting of a series of leaves varying in length from top to bottom and the other of a series of leaves of substantially uniform length bound together in offset relation to each other, and a re-inforcing leaf beneath the other leaves the projecting end of which is bound to the projecting end of the leaf on the opposite side of the main leaf against which said reinforcing leaf rests, substantially as set forth.

3. A spring arrangement for vehicles comprising two springs at each point of support spaced apart and connected to opposite sides of the part of the vehicle frame carried thereby, one of said springs consisting of a series of leaves varying in length from top to bottom and the other of a series of leaves of substantially uniform length bound together in offset relation to each other and a torque-rod connecting the frame and the springs, substantially as set forth.

In witness whereof, I have hereunto set my hand at Memphis, Tennessee, this 16th day of July, A. D. nineteen hundred and twenty.

ALBERT C. MENGES.

Witnesses:
F. M. BAILEY,
JOHN W. FARLEY.